No. 797,270. PATENTED AUG. 15, 1905.
R. DREHER.
TOOL FOR DENTAL OPERATIONS.
APPLICATION FILED MAR. 29, 1905.

WITNESSES:
E. Heymann.
L. Waldman

INVENTOR.
Rudolf Dreher
BY B. Singer
ATTORNEY.

UNITED STATES PATENT OFFICE.

RUDOLF DREHER, OF IDAR, GERMANY.

TOOL FOR DENTAL OPERATIONS.

No. 797,270.           Specification of Letters Patent.           Patented Aug. 15, 1905.

Application filed March 29, 1905. Serial No. 252,713.

*To all whom it may concern:*

Be it known that I, RUDOLF DREHER, a subject of the German Emperor, residing at Idar, Principality of Birkenfeld, Grand Duchy of Oldenburg, Germany, have invented a new and useful Tool for Dental Operations, of which the following is a specification.

My invention has for its object the provision of a tool for dentists adapted for use in the manipulation of filling material for teeth and which is impervious to the action of acids or other chemicals contained in said material.

To this end my invention consists of a dental tool provided with a working point or blade composed of agate.

By means of the improved device of my invention, wherein the working points or blades are made of agate, which is not attacked by acids, the same are readily cleaned and may be maintained smooth and polished throughout their working life.

My invention will be more fully described in connection with the accompanying drawings and will be more particularly pointed out in the appended claim.

Figure 1:
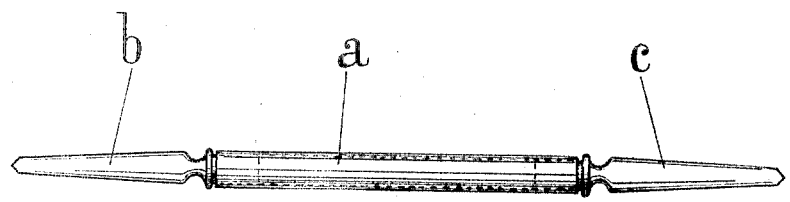
Figure 2:
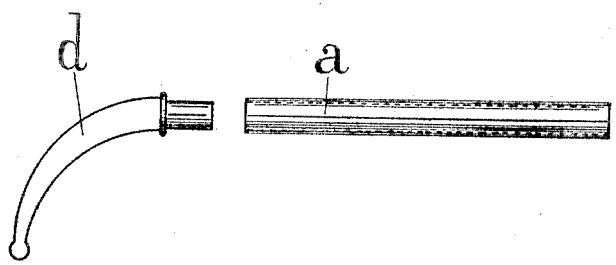

In the drawings, Figure 1 is a view in elevation of a dental tool provided with a handle having oppositely-extending working points or blades composed of agate. Fig. 2 represents a view of the handle detached from a working point, the latter having a different form from those shown in Fig. 1.

Like parts are designated by similar characters of reference throughout the figures of the drawings.

My invention, as herein shown, consists of a handle $a$, preferably hollow and open at both ends. Oppositely-extending working blades or points $b$ and $c$ are shown, each of said points being provided with tapering shanks which are inserted in the ends of the handle $a$. The said points are also provided with flanges adapted to form abutting surfaces for the ends of the handle when the points or blades are forced tightly in place therein. By means of the tapering ends the points are made interchangeable with the handle and the latter may be used in connection with a large number of points of different shapes. In Fig. 2 the handle $a$ is shown in a position to be connected with a working point $d$, which is of a generally curved formation. I construct the points $c$, $b$ and $d$ entirely of agate, although if it is desired only so much of the points may be formed of that material as is generally brought in contact with the filling material. It is well known that agate is impervious to the action of acids and that it can be safely used in connection with filling material for dental work without danger of being corroded or otherwise impaired by the actions of chemicals which said material contains.

The device of my invention has the practical advantage of great durability and also of being very cheaply manufactured, inasmuch as agate is the least valuable of the precious stones.

What I claim, and desire to secure by Letters Patent, is—

A tool for dental operations provided with a working point or blade composed of agate.

In testimony whereof I affix my signature in presence of two witnesses.

RUDOLF DREHER.

Witnesses:
     J. C. DREHER,
     WALTER HANSING.